Jan. 31, 1956 B. H. TONGUE 2,733,413

ATTENUATION EQUALIZER NETWORK

Filed April 13, 1953

INVENTOR.
BEN H. TONGUE
BY Rines and Rines
ATTORNEYS 2,733,413
Patented Jan. 31, 1956

2,733,413

ATTENUATION EQUALIZER NETWORK

Ben H. Tongue, Westfield, N. J.

Application April 13, 1953, Serial No. 348,301
6 Claims. (Cl. 333—28)

The present invention relates to attenuation equalizer networks, and more particularly to networks designed to compensate for the attenuation introduced by transmission lines into high-frequency radio-wave systems.

Attenuation equalizer networks have previously been proposed for use between an alternating-current generator and a load to control the magnitude of the current flowing to the load in some particular manner as a function of the frequency of the current. Among these equalizer networks are the so-called constant-resistance type, embodying one or more appropriately connected resistors of resistance value corresponding substantially to the load resistance, and series- and parallel-connected impedance elements, such as tuned circuits, having impedances such that their product is substantially equal to the square of the load resistance. In such networks, the impedance at the input of the equalizer network will, in theory, correspond to that of the load for all frequencies of the current. These equalizer networks are therefore frequently applied where it is desired not to disturb the existing impedance relationships of a particular circuit, such as along a transmission line between, for example, a television-signal receiving antenna system, adapted to receive radio transmissions over a predetermined band of frequencies, and a television receiver load. In actual practice, however, as distinguished from theory, satisfactory compensation for the attenuation introduced by transmission lines at the various television frequencies is not achieved.

An object of the present invention is to provide a new and improved attenuation equalizer.

A further object is to provide a novel attenuation equalizer that is particularly adapted for present-day television receiving-system transmission lines and that compensates more accurately for their attenuation characteristics.

Other and further objects will be explained hereinafter and will be more particularly pointed out in the appended claims.

Figure 1:
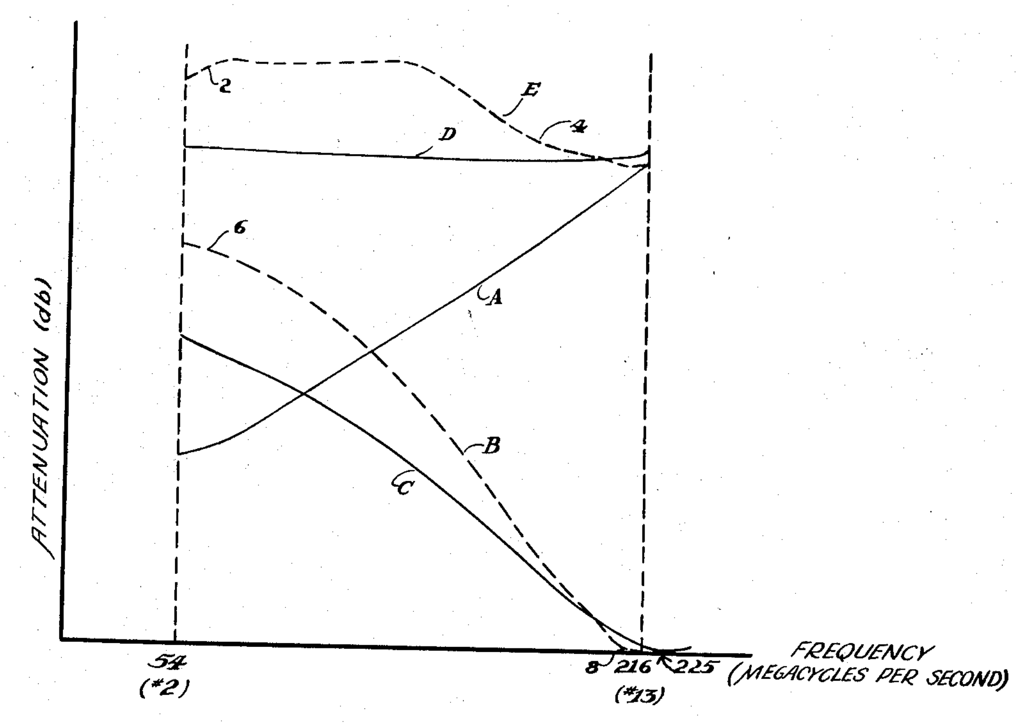
Figure 2:
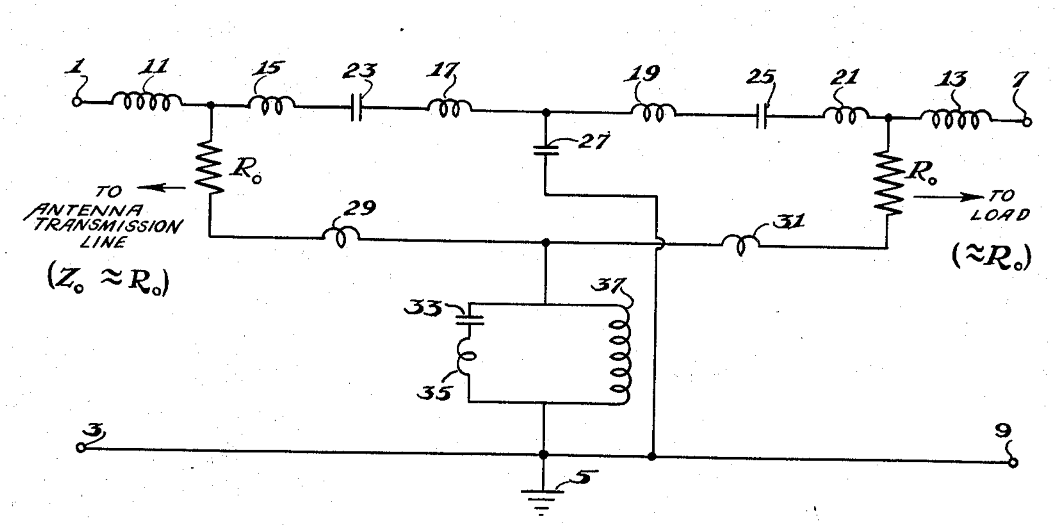

The invention will now be described in connection with the accompanying drawing, Fig. 1 of which is an explanatory graph illustrating various circuit characteristics; and Fig. 2 is a circuit diagram of an attenuator equalizer network constructed in accordance with a preferred embodiment of the invention.

Referring to Fig. 1, the solid-line curve A represents the attenuation characteristic of present-day television receiving-antenna transmission lines. Attenuation is plotted along the ordinate and frequency, along the abscissa. Curve A demonstrates that at the lower frequencies of the television band, say, in the neighborhood of channel number 2, 54 megacycles, the signal is passed with much less attenuation than at the upper frequencies of the band, say, in the neighborhood of channel number 13, 216 megacycles, and that the attenuation increases rather nonlinearly with increasing frequency. This attenuation characteristic of the transmission line results from the fact that different amounts of energy are dissipated in the line at different frequencies. As before stated, it is desirable to equalize or compensate for this variation in transmission-line dissipation over the television or other frequency band in order that, irrespective of the frequency of the radio-wave signal received by the antenna at one end of the transmission line, substantially the same signal attenuation will take place along the line.

An attenuation equalizer network of the previously described character may be inserted along the transmission line to attempt to accomplish this purpose. The tuned circuits of the network would normally be tuned to the highest frequency of the band, say 216 megacycles, providing the typical resonance characteristic illustrated by the dash-line curve B, covering the band and having, in general, somewhat the reverse slope of the line attenuation characteristic A. The symmetrical portion of the resonance curve B to the right of the vertical dotted line at 216 megacycles is not shown since its properties are not here used. Such a network, however, will not really accomplish the intended purpose as is evident from the dash-line resultant curve E representing the sum of the attenuation provided by the two curves A and B. This resultant curve E is not actually substantially constant over the band from about 54 to about 216 megacycles. Instead of a substantially flat or constant resultant curve throughout the band, there is produced, rather, a short left-hand rise 2 and a more-pronounced right-hand dip 4 in the resultant curve E because the normal resonance curve B has, generally, too extreme an outward curvature 6 at its upper left or outer skirt, and too sharp an inward bow 8 in the neighborhood of the resonant frequency of 216 megacycles.

It has been discovered that these extreme outward and inward curvatures can be corrected by a particular type of equalizer network to obtain the desired flat, substantially constant resultant characteristic D over the complete desired frequency band. To achieve such a resultant curve D, however, it is necessary to provide a network having the attenuation characteristic of curve C, later discussed. A network for accomplishing this end is illustrated in Fig. 2. This network is shown comprising input terminals 1 and 3, the latter of which may be grounded as shown at 5, and output terminals 7 and 9, the latter of which may also be grounded at 5 so that it is, in effect, connected to the input terminal 3. The input terminals 1 and 3 may be connected to the antenna transmission line such, for example, as RG11 coaxial line. The output terminals 7 and 9 may be connected to the load, which may take the form of a television receiver, booster, mixer, distribution amplifier, or any other desired load circuit, preferably presenting a resistive termination $R_0$ corresponding substantially to the characteristic impedance $Z_0$ of the line. The network of Fig. 2 is in the form of a T, the upper arm of which comprises series-connected similar inductances 11 and 13, respectively connected at opposite ends to the terminals 1 and 7, and similar series-connected intermediate inductance and condenser groups, the inductances of which are illustrated at 15, 17, 19 and 21, and the condensers, at 23 and 25. The adjacent or inner terminals of the condensers 23 and 25 are interconnected by the inductances 17 and 19 that are preferably of substantially the same inductance value. The outer terminals of the condensers 23 and 25 are connected to the pair of similar coils 15 and 21. Between the coils 17 and 19 is connected a low shunt capacitance 27 which, in turn, connects with the grounded terminal 5. Shunting the elements 15, 23, 17, 19, 25 and 21 is a supplemental circuit comprising two similar resistors of value substantially equal to $R_0$, inter-connected by similar inductances 29 and 31 of less inductance than the elements 15, 17, 19 and 21. From the intermediate junction between the inductances 29 and 31 in the supplemental circuit is connected an inductance 37. Between the terminals of the inductance 37 is paralleled a series-connected condenser 33 and further inductance 35. The lower terminals of the inductances 37 and 35 are grounded at 5.

From the broad point of view, these network elements form a series-resonant circuit and a shunt anti-resonant circuit. At the low television frequencies in the neighborhood of 54 megacycles, the functional elements of the series-resonant circuit are the similar condensers 23 and 25 and the series-connected inductances 15, 17, 19 and 21. The inductances 11 and 13 and the inductances 29 and 31 are of sufficiently less inductance value, however, to present substantially zero or very small impedance at the low channel frequencies. The low shunt capacitance of the condenser 27 presents substantially infinite or very high impedance at the low channel frequencies. The anti-resonant circuit comprises the condenser 33 and the inductance 37 which are preferably of larger capacitance and less inductance, respectively, than the other condensers and inductances, and the further inductance 35 which is of low inductance value to present substantially zero or very small impedance at the low channel frequencies. At the high channel frequencies, on the other hand, say in the neighborhood of 216 megacycles frequency, the physical length of the equalizer network itself becomes comparable with a substantial fractional portion of the quarter-wave-length of these high channel frequencies, which is not the case at the low channel frequencies. The series-resonant circuit is now in the nature of a distributed line section including in addition to the elements 15, 23, 17, 19, 25 and 21, the pair of inductances 11 and 13 of less inductance. The series-resonant circuit, moreover, is shunted by the capacitor 27 which now presents a more finite or lower shunt impedance. The anti-resonant circuit at the high frequencies of the band comprises the inductance 37 in parallel with the condenser 33 and inductance 35. The inductances 29 and 31 of the supplemental circuit embodying the resistors $R_0$ are more effective at these high frequencies than at the low frequencies.

At the low frequencies of the band, therefore, the series-resonant circuit appears as a series capacity only connecting the input terminal 1 and the output terminal 7. The anti-resonant circuit appears substantially as an inductance partially connecting the resistors $R_0$ in shunt across the input and output terminals. At the very highest channel frequency, the series-resonant circuit behaves as a very large capacity and thus substantially a short-circuit, and the anti-resonant circuit appears as a very large inductance and thus substantially an open circuit, resulting in a very small transmission loss caused only by inductances 11 and 13 and the capacitor 27. To the input terminals 1 and 3 there is thus presented substantially the impedance $R_0$ at all frequencies from the low to the high channel frequencies. The product of the impedance of the anti-resonant circuit times the impedance of the series-resonant circuit is substantially equal to $R_0^2$.

It has been discovered that if both the series-resonant circuit and the anti-resonant circuit are tuned to a frequency slightly above the frequency representing the upper limit of the desired predetermined band of frequencies, the inward bow 8 can be reduced at the right-hand end of the curve B. By maintaining substantially zero series resistance in the anti-resonant circuits 33, 35 and 37, furthermore, the extreme outward bow 6 is found to be substantially eliminated in the left-hand region of the curve B, so that the curve C continues as substantially a straight line as the frequency decreases.

Thus, in the case of the television band, by tuning the series and anti-resonant circuits to, for example, 225 megacycles, slightly above the 216 megacycle limit of the band, as shown in curve C, Fig. 1, there is produced only a slight inward curve near 216 megacycles almost equal and opposite to the slight curvature at the upper right-hand end of the line-attenuation curve A. The elimination of resistance in the shunt anti-resonant circuit, furthermore, eliminates the outward left-hand skirt 6 of curve B, more closely following, in the opposite sense, the curvature at the left-hand end of the line-attenuation curve A. Still further, the slope of the intermediate portion of the curve C is then found more closely to approximate the reverse slope of the inner portion of the line-attenuation curve A. Because of this closer approximation to the attenuation characteristics of the line, therefore, the substantially flat resultant curve D is achieved over the complete desired band of frequencies. The symmetrical portion of the resonance curve C to the right of the 225-megacycle point is also not shown since it plays no part in the operation of the system.

As an example of typical values for network elements, the capacitors 23 and 25 may be 12 micro-microfarads. The inductances 15, 17, 19 and 21 may be formed of two and one-half turns each of number 22 wire on a 7/64 inch form. The capacitor 27 may be the stray capacity of a tie-point lug, not shown, connecting the inductances 17 and 19 to the ground 5 and may be of the order of the 0.3 micro-microfarad. The inductances 29 and 31 may be the stray inductance of the leads of the resistors $R_0$, which may be about 1/4 inch long, the resistors having a value, for example, of about 75 ohms. The condenser 33 may have a value of about 16 micro-microfarads, with the inductance 35 being the inductance of the leads of the condenser. This inductance must be kept very small so that, in fact, the terminals of the condenser may be soldered directly to the adjacent circuit. The inductance 37 may be a single loop of number 22 bare wire about an inch and an eighth in length. This particular network has been found, in practice, to produce the desirable characteristics illustrated in curve C, providing a loss ranging from about 1 db at 216 megacycles to about 17 db at 54 megacycles. When this network characteristic is combined with the line attenuation characteristic A of RG11/U line, for example, the substantially uniform resultant characteristic D is produced over the complete television band, equalizing the loss over the band produced by about one-thousand feet of the transmission line.

While the invention has been described in connection with its preferred application to the television band and to a particular coaxial transmission line, it is to be understood that it may be utilized over different frequency bands and with other types of transmission line systems, such as parallel-wire line, as well as other types of attenuating systems.

Further modifications will occur to those skilled in the art and all such are considered to fall within the spirit and scope of the invention as defined in the appended claims.

What is claimed is:

1. An attenuation equalizer network having, in combination, a pair of input terminals adapted to be connected to a transmission line the attenuation of which increases with increasing frequency over a predetermined band of radio frequencies fed along the line, a pair of output terminals adapted to be connected to a load presenting substantially a resistive termination of value $R_0$ corresponding substantially to the characteristic impedance of the line, one input terminal being connected to one output terminal, a series-resonant circuit comprising a pair of similar condensers adjacent terminals of which are interconnected by a first pair of series-connected similar inductances and the other terminals of which are each connected through a pair of further inductances to the other input and output terminals of the network, one of each of the pair of further inductances being of value substantially the same as the inductance of the first pair of inductances and the other of the pair of further inductances being of less inductance in order that the said other inductances may present a low impedance at the lower frequencies of the said band, a low shunt capacitance connected between the connection of the inductances of the first pair of series-connected similar inductances and the said one input and output terminals of the network, a supplemental circuit connected across the series-resonant circuit and comprising a pair of resistors of values substantially equal to $R_0$ in series with inductance of value less than the inductance of the said first pair of similar inductances, and a shunt anti-resonant circuit connected from a point of the supplemental circuit intermediate the resistors to the said one input and output terminals of the network and comprising an inductance of value larger than the inductance of the said other inductances of the pairs of further inductances shunted by a condenser, the resonant and anti-resonant circuits being tuned to a frequency slightly greater than the highest frequency of the said band of frequencies.

2. An attenuation equalizer network having, in combination, a pair of input terminals adapted to be connected to a transmission line the attenuation of which increases with increasing frequency over a predetermined band of radio frequencies fed along the line, a pair of output terminals adapted to be connected to a load presenting substantially a resistive termination of value $R_0$ corresponding substantially to the characteristic impedance of the line, one input terminal being connected to one output terminal, a series-resonant circuit comprising a pair of similar condensers adjacent terminals of which are interconnected by a first pair of series-connected similar inductances and the other terminals of which are each connected through a pair of further inductances to the other input and output terminals of the network, one of each of the pair of further inductances being of value substantially the same as the inductance of the first pair of inductances and the other of the pair of further inductances being of less inductance in order that the said other inductances may present a low impedance at the lower frequencies of the said band, a low shunt capacitance connected between the connection of the inductances of the first pair of series-connected similar inductances and the said one input and output terminals of the network, a supplemental circuit connected across the series-resonant circuit and comprising a pair of resistors of value substantially equal to $R_0$ in series with inductance of value less than the inductance of the said first pair of similar inductances, and a shunt anti-resonant circuit connected from a point of the supplemental circuit intermediate the resistors to the said one input and output terminals of the network and comprising an inductance of value larger than the inductance of the said other inductances of the pairs of further inductances shunted by a condenser of capacitance greater than the said shunt capacitance, the resonant and anti-resonant circuits being tuned to a frequency slightly greater than the highest frequency of the said band of frequencies.

3. An attenuation equalizer network having, in combination, a pair of input terminals adapted to be connected to a transmission line having one grounded side and the attenuation of which increases with increasing frequency over a predetermined band of radio frequencies fed along the line, a pair of output terminals adapted to be connected to a load presenting substantially a resistive termination of value $R_0$ corresponding substantially to the characteristic impedance of the line, one input terminal and one output terminal being grounded, a series-resonant circuit comprising a pair of similar condensers adjacent terminals of which are interconnected by a first pair of series-connected similar inductances and the other terminals of which are each connected through a pair of further inductances to the other input and output terminals of the network, one of each of the pair of further inductances being of value substantially the same as the inductance of the first pair of inductances and the other of the pair of further inductances being of less inductance in order that the said other inductances may present a low impedance at the lower frequencies of the said band, a low shunt capacitance connected between the connection of the inductances of the first pair of series-connected similar inductances and ground, a supplemental circuit connected across the series-resonant circuit and comprising a pair of resistors of value substantially equal to $R_0$ in series with inductance of the leads of the resistors of value less than the inductance of the said first pair of similar inductances, and a shunt anti-resonant circuit connected from a point of the supplemental circuit intermediate the resistors to ground and comprising an inductance of value larger than the inductance of the said other inductances of the pairs of further inductances shunted by a condenser of capacitance greater than the said shunt capacitance, there being negligible series resistance between the said point of the supplemental circuit and the said one input and output terminals, and the resonant and anti-resonant circuits being tuned to a frequency slightly greater than the highest frequency of the said band of frequencies.

4. An attenuation equalizer network having, in combination, a pair of input terminals adapted to be connected to a transmission line the attenuation of which increases with increasing frequency over a predetermined band of radio frequencies fed along the line, a pair of output terminals adapted to be connected to a load presenting substantially a resistive termination of value $R_0$ corresponding substantially to the characteristic impedance of the line, one input terminal being connected to one output terminal, a series-resonant circuit comprising a pair of condensers adjacent terminals of which are interconnected by a first pair of series-connected inductances and the other terminals of which are each connected through a second pair of inductances to the other input and output terminals of the network, a shunt capacitance connected between the connection of the inductances of the first pair of series-connected inductances and the said one input and output terminals of the network, a supplemental circuit connected across the series-resonant circuit and comprising a pair of resistors of value substantially equal to $R_0$ is series with further inductance, and a shunt anti-resonant circuit connected from a point of the supplemental circuit intermediate the resistors to the said one input and output terminals of the network and comprising an inductance shunted by capacitance, the resonant and anti-resonant circuits being tuned to a frequency slightly greater than the highest frequency of said band of frequencies.

5. An attenuation equalizer network having, in combination, a pair of input terminals adapted to be connected to a transmission line the attenuation of which increases with increasing frequency over a predetermined band of radio frequencies fed along the line, a pair of output terminals adapted to be connected to a load presenting substantially a resistive termination of value $R_0$ corresponding substantially to the characteristic impedance of the line, one input terminal being connected to one output terminal, a series-resonant circuit comprising condenser means the opposite terminals of which are each connected through a pair of inductances to the other input and output terminals of the network, shunt capacitance connected between the series circuit and the said one input and output terminals of the network, a supplemental circuit connected across the series-resonant circuit and comprising a pair of resistors of value substantially equal to $R_0$ in series with further inductance, and a shunt anti-resonant circuit connected from a point of the supplemental circuit intermediate the resistors to the said one input and output terminals of the network and comprising an inductance shunted by capacitance, the resonant and anti-resonant circuits being tuned to a frequency slightly greater than the highest frequency of the said band of frequencies.

6. An attenuation equalizer network having, in combination, a pair of input terminals adapted to be connected to a transmission line the attenuation of which increases with increasing frequency over a predetermined band of radio frequencies fed along the line, a pair of output terminals adapted to be connected to a load presenting substantially a resistive termination of value $R_0$ corresponding substantially to the characteristic impedance of the line, one input terminal being connected to one output terminal, a series-resonant circuit comprising condenser means one terminal of which is connected through a pair of inductances to the other input terminal of the network and another terminal of which is connected through further inductance to the other output terminal, shunt capacitance connected between the series circuit and the said one input and output terminals of the network, a supplemental circuit connected across the series-resonant circuit and comprising a pair of resistors of value substantially equal to $R_0$ in series with further inductance, and a shunt anti-resonant circuit connected from a point of the supplemental circuit intermediate the resistors to the said one input and output terminals of the network and comprising an inductance shunted by capacitance, the resonant and anti-resonant circuits being tuned to a frequency slightly greater than the highest frequency of the said band of frequencies.

References Cited in the file of this patent

UNITED STATES PATENTS

| | | |
|---|---|---|
| 1,606,817 | Stevenson | Nov. 16, 1926 |
| 2,694,184 | Rounds | Nov. 9, 1954 |

FOREIGN PATENTS

| | | |
|---|---|---|
| 148,400 | Australia | Sept. 29, 1952 |